(12) United States Patent
Minote

(10) Patent No.: US 6,633,518 B1
(45) Date of Patent: Oct. 14, 2003

(54) DISK RECORDING AND/OR REPRODUCING APPARATUS HAVING A MOVABLE TRAY

(75) Inventor: Tsuyoshi Minote, Tokyo (JP)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 09/830,153

(22) PCT Filed: Aug. 24, 2000

(86) PCT No.: PCT/JP00/05695

§ 371 (c)(1),
(2), (4) Date: Jul. 10, 2001

(87) PCT Pub. No.: WO01/15160

PCT Pub. Date: Mar. 1, 2001

(30) Foreign Application Priority Data

Aug. 24, 1999 (JP) .............................. 11-237177

(51) Int. Cl.[7] .............................................. G11B 17/04
(52) U.S. Cl. ................................ 369/30.93; 369/30.98; 369/30.94
(58) Field of Search ........................... 369/30.93–30.98

(56) References Cited

U.S. PATENT DOCUMENTS 5,173,889 A * 12/1992 Nagahisa et al. ......... 369/30.88
5,197,057 A * 3/1993 Iyama et al. ............. 369/31.01
5,563,857 A * 10/1996 Park ........................ 369/30.98
6,151,279 A * 11/2000 Ikedo et al. ............. 369/30.98
6,195,312 B1 * 2/2001 Huang .................... 369/30.96

FOREIGN PATENT DOCUMENTS

| JP | 3-57760 | 6/1991 | |
| JP | 04195764 A | * 7/1992 | ........... G11B/17/24 |
| JP | 7-19842 | 4/1995 | |
| JP | 7-161118 | 6/1995 | |

* cited by examiner

Primary Examiner—William Klimowicz
(74) Attorney, Agent, or Firm—Oblon, Spivak, McClelland, Maier & Neustadt, P.C.

(57) ABSTRACT

A disk recording and/or reproducing apparatus recording and/or reproducing information on and/or from anyone of a plurality of disk-like recording mediums. Freedom in design is improved by effectively utilizing spaces in which respective portions and mechanisms of the apparatus are disposed. In the apparatus, a first planet gear and second planet gear meshed with a racked portion are switched, whereby the disk tray is moveable between a loading position at which the disk tray is loaded into the apparatus and an eject position at which the disk tray is ejected to a location outside the apparatus body.

25 Claims, 12 Drawing Sheets

DISK RECORDING AND/OR REPRODUCING APPARATUS HAVING A MOVABLE TRAY

TECHNICAL FIELD

The present invention relates to a disk recording and/or reproducing apparatus. More particularly, the present invention relates to a disk recording and/or reproducing apparatus for recording and/or reproducing information on and/or from any one of a plurality of disk-like recording mediums.

BACKGROUND ART

There are disk recording and/or reproducing apparatuses capable of recording a signal on a disk-like recording medium or reproducing a signal from a disk-like recording medium or recording and reproducing a signal on and from a disk-like recording medium. Of these disk recording and/or reproducing apparatuses, there is a recording and/or reproducing apparatus called a disk changer in which a plurality of disk-like recording mediums are stored and a signal can be recorded on a desired disk-like recording medium.

In the disk changer, the disk-like recording mediums are respectively held on respective holding portions of a disk hold table, and the disk tray is loaded into a case. Then, until a desired disk-like recording medium to be recorded or reproduced reaches a recording and reproducing position, the disk hold table is rotated and the desired disk-like recording medium is chucked on the holding surface by a chucking mechanism provided within the case and thereby recorded or reproduced. At that time, since the recording or reproducing disk-like recording medium is chucked on the holding surface by the chucking mechanism, the disk-like recording medium is slightly spaced apart from the holding surface of the disk hold table in the upper direction.

When another disk-like recording medium is recorded or reproduced, the disk-like recording medium that has been recorded or reproduced so far is released from the chucked state and this disk-like recording medium is again held on the original holding portion of the disk hold table. Then, the disk hold table is rotated and another disk-like recording medium is chucked by the chucking mechanism and thereby recorded or reproduced.

Disk-like recording mediums held on the disk tray can be exchanged by ejecting the disk tray from the case. The disk-like recording medium can be exchanged both in a first mode in which the disk-like recording medium is not being recorded or reproduced and in a second mode in which the disk-like recording medium is being recorded or reproduced.

When the disk-like recording medium is exchanged in the first mode in which the disk-like recording medium is not being recorded or reproduced, all disk-like recording mediums can be exchanged by rotating the disk hold table. When the disk-like recording medium is exchanged in the second mode in which the disk-like recording medium is being recorded or reproduced, if the disk hold table is rotated, there is then the possibility that, when the disk tray is loaded into the case, the disk-like recording medium of which the recording or the reproduction was finished cannot be properly held on the holding portion of the disk hold table. For this reason, the disk-like recording medium cannot be exchanged by rotating the disk hold table. Accordingly, only the disk-like recording medium on a predetermined holding portion of the holding portions of the disk hold table ejected from the case can be exchanged.

In the above disk changer, a large U-shaped groove comprised of two straight-line portions and circular-arc portions continued to each end of the straight-line portions is formed on the bottom surface of the disk tray. There is also provided a tray movement member including a gear portion which is meshed with the rack groove. While one straight-line portion of the rack groove and the gear portion are being meshed with each other, the disk tray is ejected from or loaded into a base assembly in the first mode by rotating the gear portion. While the other straight-line portion of the rack groove and the gear portion are being meshed with each other, the disk tray is ejected from or loaded into the base assembly in the second mode by rotating the gear portion.

However, in the above disk changer, the disk tray is moved in the first mode and the second mode by using the two straight-line portions of the large U-like rack portion and the gear portion of the tray movement member is moved along the rack groove so that a large space required by the tray movement member to move becomes necessary. There is a disadvantage in that spaces in which respective members of other mechanism are disposed are limited.

Since spaces in which respective members are disposed are limited, freedom in design is unavoidably lowered.

Accordingly, it is an object of the present invention to provide a disk recording and/or reproducing apparatus in which the above problems can be overcome and in which freedom in design can be improved by effectively utilizing spaces in which respective portions and mechanisms are disposed.

DISCLOSURE OF THE INVENTION

A disk recording and/or reproducing apparatus according to the present invention comprises a drive motor, a gear drive section including a center gear rotated by the drive motor and first and second planet gears meshed with the center gear and rotated by the center gear, the first and second planet gears being revolving around the center gear, a rack portion selectively meshed with any one of the first planet gear and the second planet gear, a disk tray including a plurality of holding portions on which a plurality of disk-like recording mediums are held, respectively, the disk tray being freely moved between an eject position at which at least one of a plurality of holding portions is projected to the outside of an apparatus body and a loading position at which at least one of a plurality of holding portions is loaded into the apparatus body, a recording and/or reproducing section for recording or reproducing any one disk-like recording medium of a plurality of disk-like recording mediums respectively held on a plurality of holding portions and a preventing mechanism for preventing the first planet gear and the second planet gear from revolving when any of the first planet gear and the second planet gear is meshed with the rack portion, wherein when the disk tray is moved to the eject position while the recording and/or reproducing section is being located at the non-operation state, the preventing mechanism prevents the first planet gear and the second planet gear from revolving and the first planet gear is meshed with the rack portion thereby to allow the disk tray to move between the loading position and the eject position and when the disk tray is moved to the eject position while the recording and/or reproducing section is placed in the state for recording or reproducing any one disk-like recording medium of a plurality of disk-like recording mediums which are respectively held on a plurality of holding portions, wherein the preventing mechanism prevents the first planet gear and the second planet gear from revolving and the second planet gear is meshed with the rack portion to thereby allow the disk tray to move between the loading position and the eject position.

Therefore, in the disk recording and/or reproducing apparatus according to the present invention, the first planet gear and the second planet gear meshed with the rack portion are switched, whereby the disk tray is moved between the loading position at which the disk tray is loaded into the apparatus body and the eject position at which the disk tray is ejected to the outside of the apparatus body.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

BEST MODE FOR CARRYING OUT THE INVENTION

A disk changer serving as a disk recording and/or reproducing apparatus according to an embodiment of the present invention will be described below with reference to the accompanying drawings.

In the following embodiment, the present invention will be described, in which case the present invention is applied to a disk changer in which a plurality of disk-like recording mediums (hereinafter simply referred to as "disks") such as an optical disk like a so-called compact disk and which is capable of reproducing a signal from a desired disk.

Figure 1:
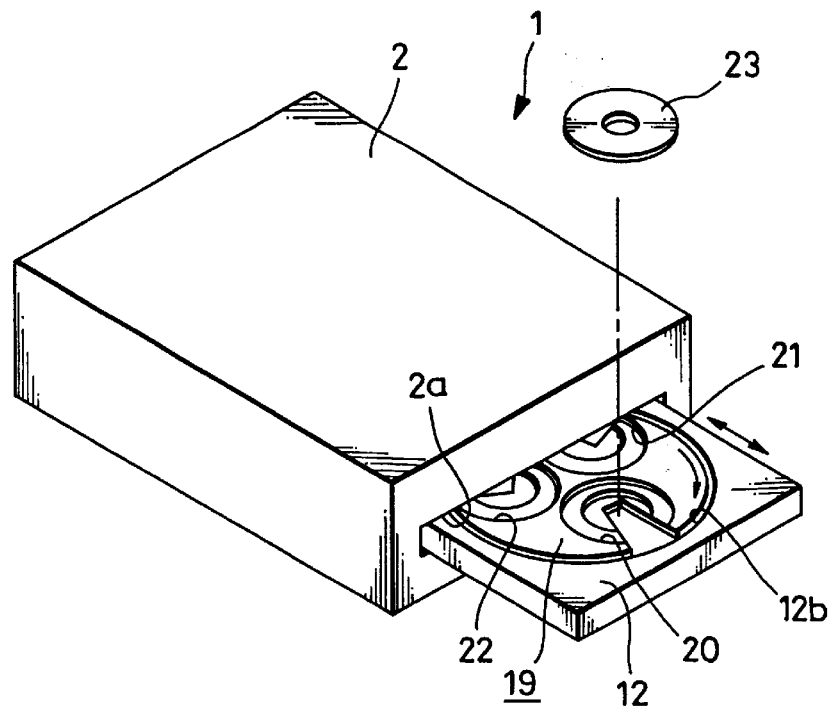
FIG. 1 shows a disk changer according to an embodiment of the present invention together with FIGS. 2 to 13 and is a schematic perspective view of the disk changer in an open mode.
Figure 2:
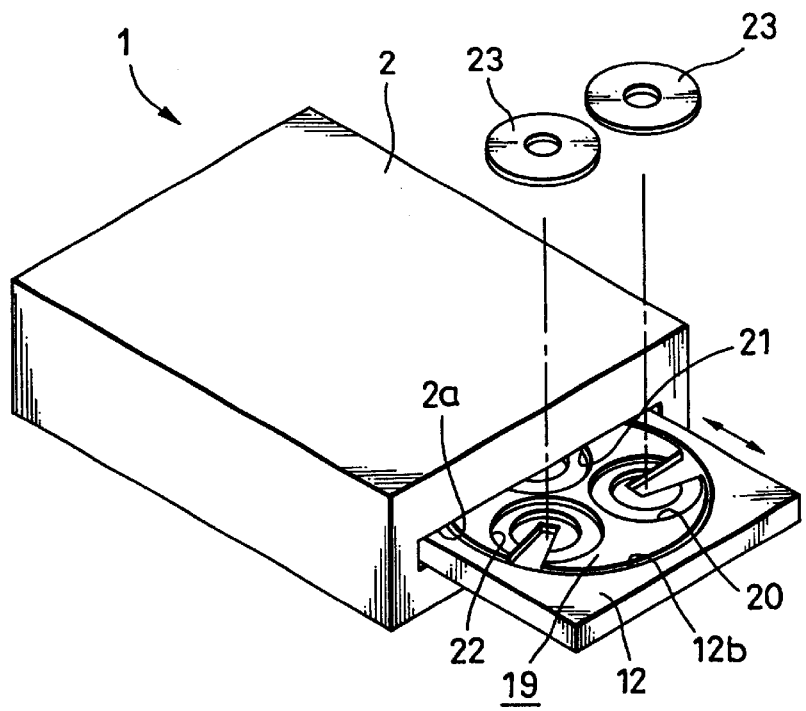
FIG. 2 is a schematic perspective view of the disk changer in an exchange mode.

A disk changer 1 has a casing 2 in which predetermined respective mechanisms and respective members are disposed, and an insertion and eject slot 2a is formed at the front surface of the casing 2 as shown in FIGS. 1 and 2.

Figure 3:
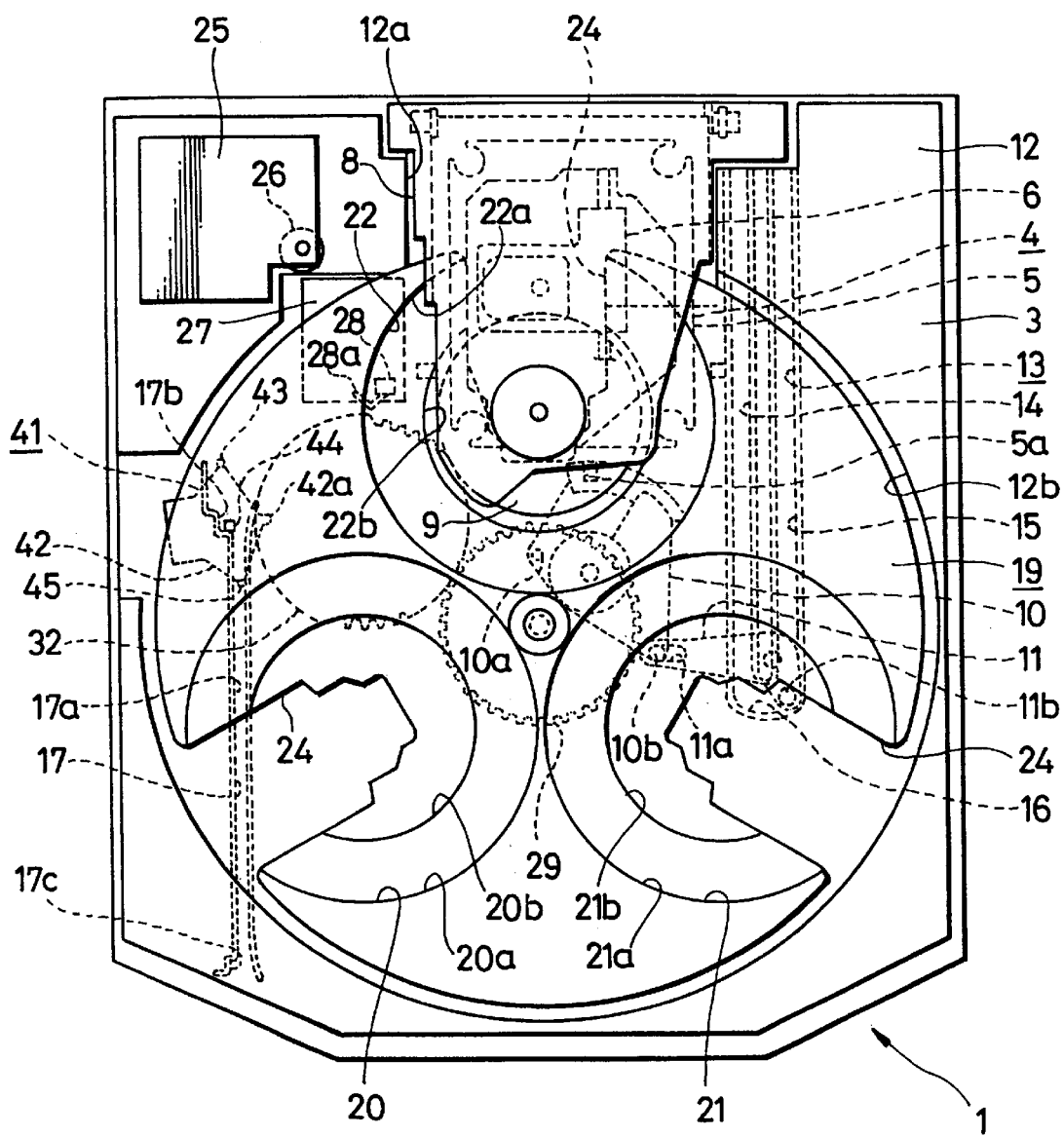
FIG. 3 is a schematic plan view showing the state in which a disk location table is placed at the insertion position.
Figure 4:
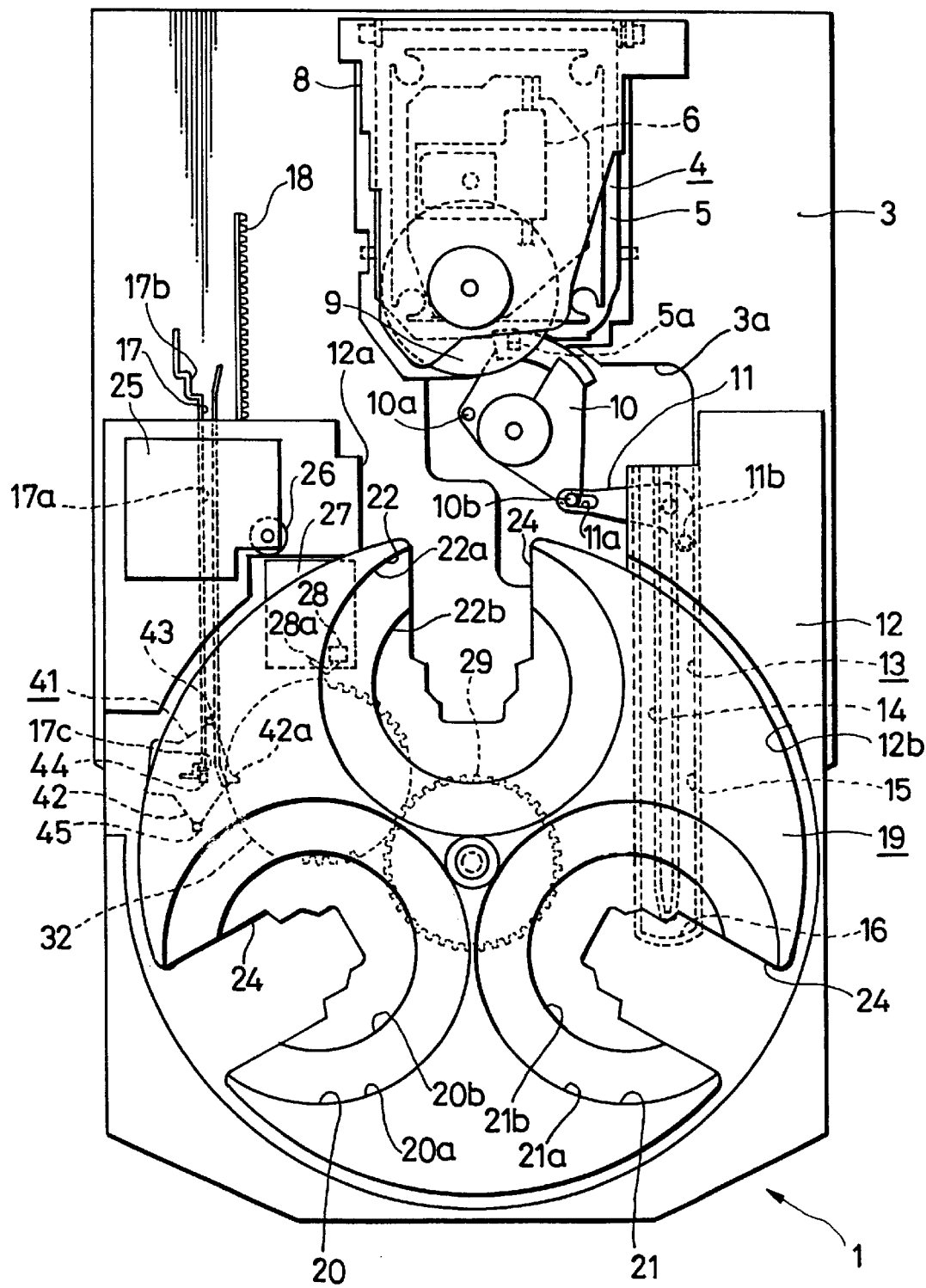
FIG. 4 is a schematic plan view showing the state in which the disk location table is placed at the eject position.

A base assembly 3 is disposed with the case 2, and a layout concave portion 3a is formed within the base assembly as shown in FIGS. 3 and 4. At the portion of the rear side of the layout concave portion 3, there is supported a base unit 4 as a reproducing section so as to become freely rotatable around the rear end portion.

The base unit 4 has a support base 5 on which predetermined respective mechanisms are disposed. The support base 5 has an optical pickup 6 supported thereon such that the optical pickup can be freely moved along the radius direction of an optical disk which will be described later on. A disk table 7 is provided on the support base 5. The disk table 7 is rotated by drive force of a spindle motor, not shown, whereby a disk held on the disk table 7 is rotated at a constant linear velocity or a constant angular velocity, for example. An engagement protrusion 5a is protruded forward from the front surface of the support base 5.

A pulley support portion 8 is formed on the base assembly 3 so as to cover the portion of the rear side of the layout concave portion 3a from the upper direction. At the upper position of the disk table 7 of the pulley support portion 8, there is rotatably supported a chucking pulley 9 in an opposing relation to the disk table 7.

At the portion of the front side of the layout concave portion 3a, there is supported a cam member 10 so as to become freely rotatable. The cam member 10 includes a cam protrusion 10a and a support protrusion 10b which are respectively upwardly protruded at the opposite positions in an angular extent of approximately 180° across a rotation fulcrum of the cam member 10. A cam groove 10c which is opened forward is formed at substantially the front end portion of the cam member 10. The cam groove 10c is inclined in such a manner that it is upwardly displaced in the left-hand side.

The engagement protrusion 5a of the base unit 4 is inserted into and engaged with the cam groove 10c. While the cam member 10 is being rotated in the C1 direction shown in FIGS. 8 to 10 and the engagement protrusion 5a is being engaged with the right end of the cam groove 10c, the base unit 4 is located at the lower movement end of a disk tray which will be described later on. While the cam member 10 is being rotated in the C2 direction shown in FIGS. 8 to 10 and the engagement protrusion 5a is being engaged with the left end of the cam groove 10c, the base unit 4 is located at the upper movement end, whereby the disk is lifted from a location table of the disk tray, which will be described later on, and the disk is held on the table 7 so that the disk can be chucked by the disk table 7 and the chucking pulley 9.

A swing lever 11 is rotatably supported at the portion of the front side of the layout concave portion 3. The swing lever 1 has an oblong hole 11a defined thereon. A support protrusion 10b of the cam member 10 is swingably engaged with the oblong hole 11a. An engagement protrusion 11b is upwardly protruded from the swing lever 11. A distance from the rotation center of the swing lever 11 to the engagement protrusion 11b is set to be considerably small as compared with a distance from the rotation center to the oblong hole 11a.

Figure 8:
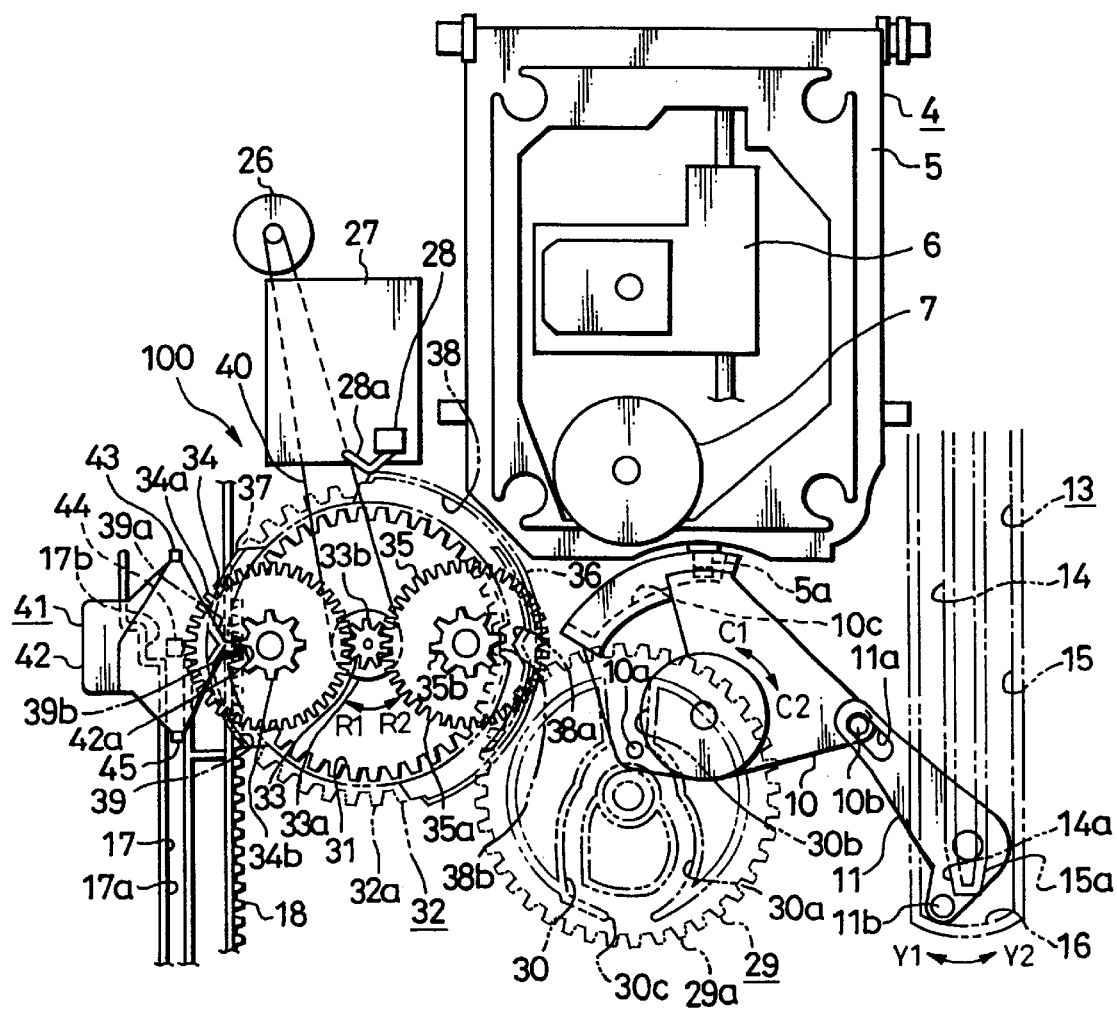
FIG. 8 shows an operation of a disk changer together with FIGS. 9 to 13 and is a schematic enlarged plan view showing a stop mode.
Figure 9:
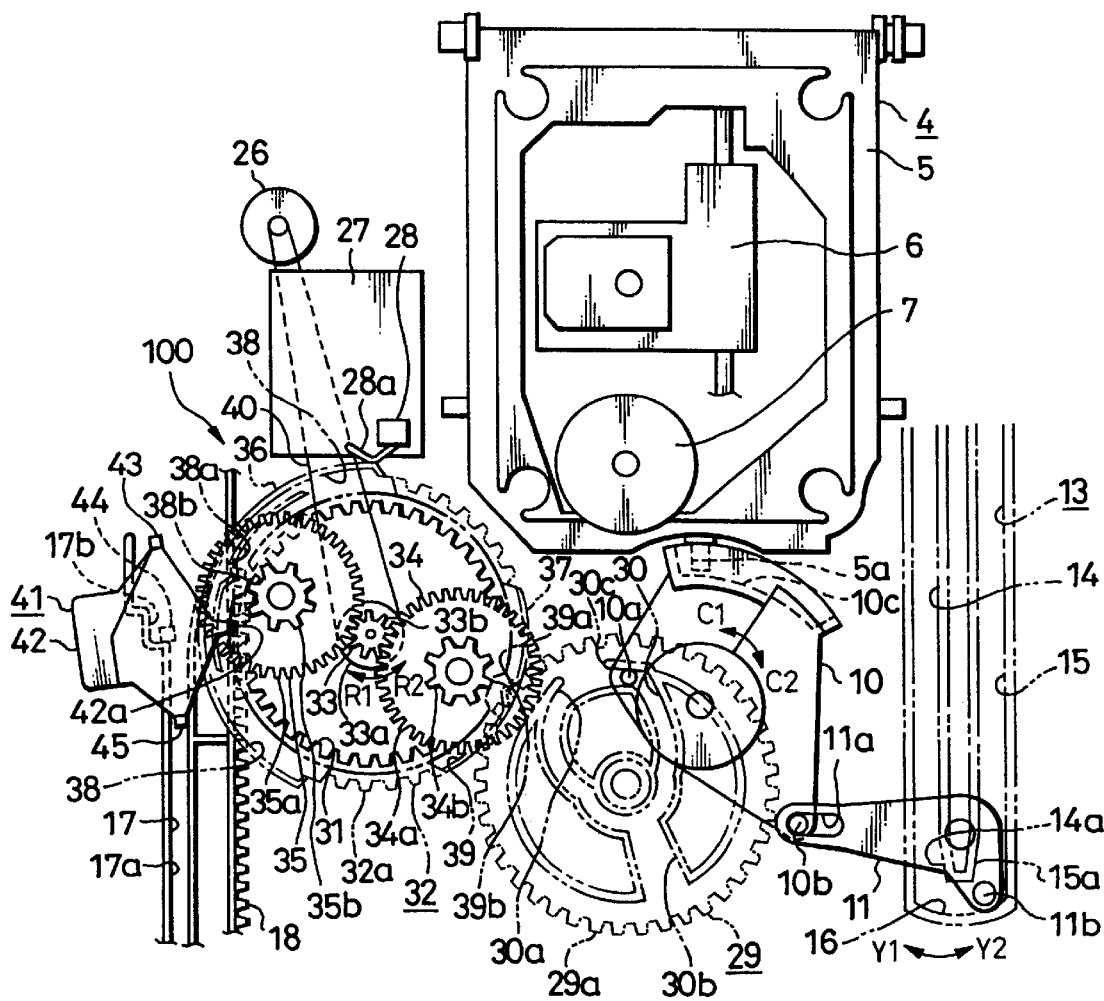
FIG. 9 is a schematic enlarged plan view showing a playback mode.
Figure 10:
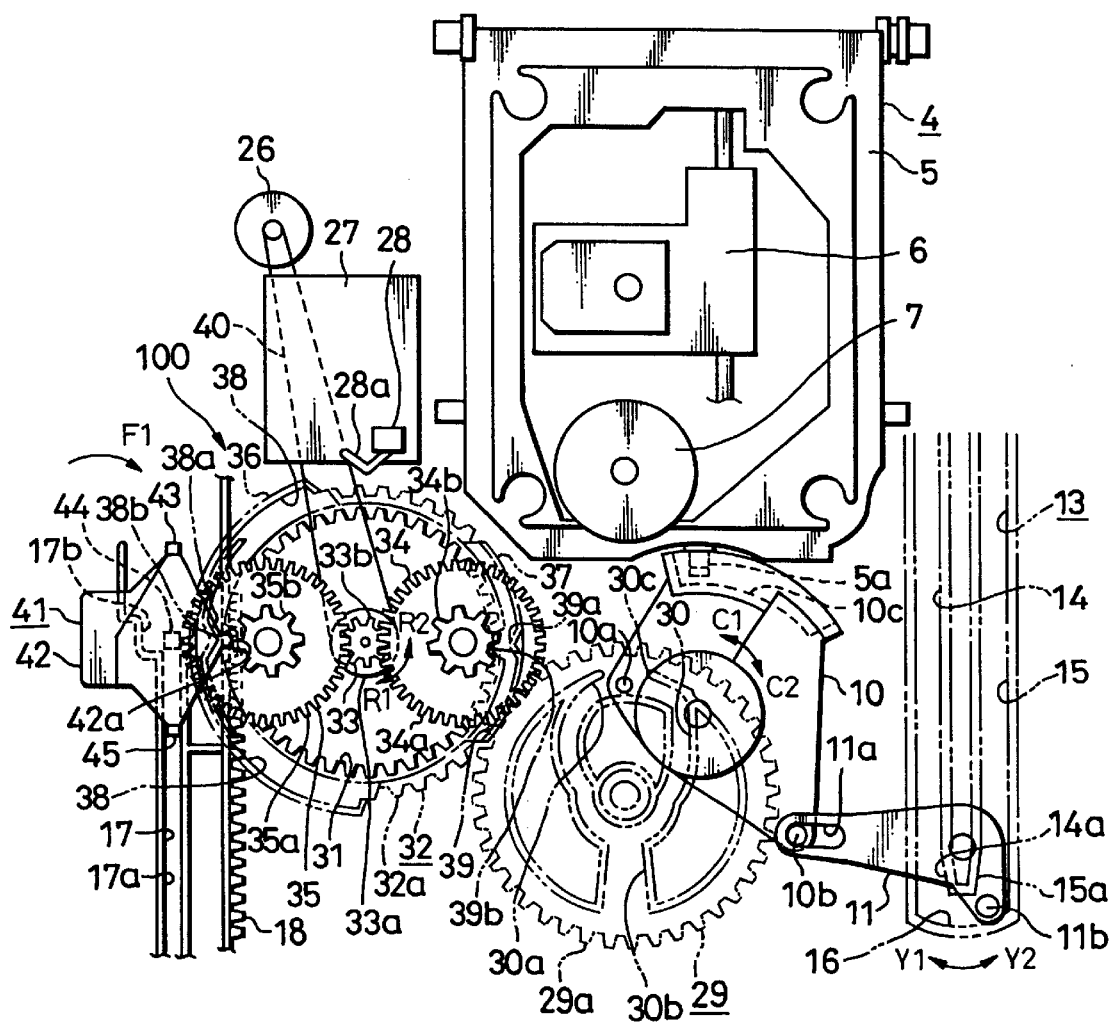
FIG. 10 is a schematic enlarged plan view showing the state presented before the exchange mode is set.

The swing lever 11 is rotated in accordance with the rotation operation of the cam member 10. Specifically, when the cam member 10 is rotated in the C1 direction shown in FIGS. 8 to 10, the swing lever 11 is rotated in the Y1 direction shown in FIGS. 8 to 10 so that the engagement protrusion 11b is located at the movement end of the left-hand side as shown in FIG. 8. At that very time, the base unit 4 has been descended as described above. When the cam member 10 is rotated in the C2 direction shown in FIGS. 8 to 10, the swing lever 11 is rotated in the Y2 direction shown in FIGS. 8 to 10 so that the engagement protrusion 11b is located at the movement end of the right-hand side as shown in FIGS. 9 and 10. At that very time, the base unit 4 is elevated to the position of the upper movement end as described above.

The disk tray 12 is supported to the base assembly 3 so as to become freely movable back and forth as shown in FIGS. 3 and 4. The disk tray 12 is moved between a position at which a part of the disk tray 12, i.e., at least one holding portion of a disk hold table, which will be described later on, is protruded from the insertion and eject slot 2a of the case 2 as shown in FIG. 1 or 4 and a loading position at which a disk stored within the case 2 is reproduced as shown in FIG. 3. A recess portion 12a which is opened backwardly is formed at the center of the rear end portion of the disk tray 12. While the disk tray 12 is being located at the movement end of the rear side, i.e., at the insertion position at which the disk tray 12 is inserted into the case 2, i.e., disk can be reproduced, the recess portion 12a is located in an opposing relation to the base unit as shown in FIG. 3.

As shown in FIGS. 3 and 4, a support groove 13 which is opened downwardly is formed at the right-hand end position of the bottom surface side of the disk tray 12. The support groove 13 is comprised of a first rectilinear groove portion 14, a second rectilinear groove portion 15 and a circular-arc groove portion 16 which are formed continuously.

The groove portion 14 and the second groove portion 15 are extended back and forth in parallel to each other, and their groove widths except front end portions 14a, 15a are substantially the same as the diameter of the engagement protrusion 11b of the swing lever 11. The front end portions 14a and 15a of the first groove portion 14 and the second groove portion 15 increase their groove widths in the forward direction. Both ends of the circular-arc groove portion 16 are continued to the front end of the first groove portion 14 and the front end of the second groove portion 15, and its groove width is slightly wider than the diameter of the engagement protrusion 11b.

The engagement protrusion 11b of the swing lever 11 is inserted into the support groove 13 (see FIGS. 3, 4, 8 to 13). While the disk tray 12 is being located at the loading position, the engagement protrusion 11b is inserted into the circular-arc groove portion 16 of the support groove 13, and the engagement protrusion 11b is moved within the circular-arc groove portion 16 in accordance with the rotation operation of the cam member 10 (see FIG. 3 and FIGS. 8 to 10).

While the cam member 10 is being located at the movement end of the C1 direction shown in FIGS. 8 to 10 and the base unit 4 is being descended, as shown in FIG. 8, the engagement protrusion 11b is located at the left-hand end of the circular-arc groove portion 16. In this state, when the disk tray 12 is moved forward relative to the base assembly 3, i.e., moved to the position shown in FIG. 1 or 4, the engagement protrusion 11b is inserted into the first groove portion 14 and is relatively moved backward within the first groove portion 14 (see FIGS. 12 and 13). Conversely, when the disk tray 12 is moved from the forward, i.e., the position shown in FIG. 1 or 4 to the rearward, i.e., the position shown in FIG. 3, the engagement protrusion 11b is moved relatively forward within the first groove portion 14.

Figure 11:
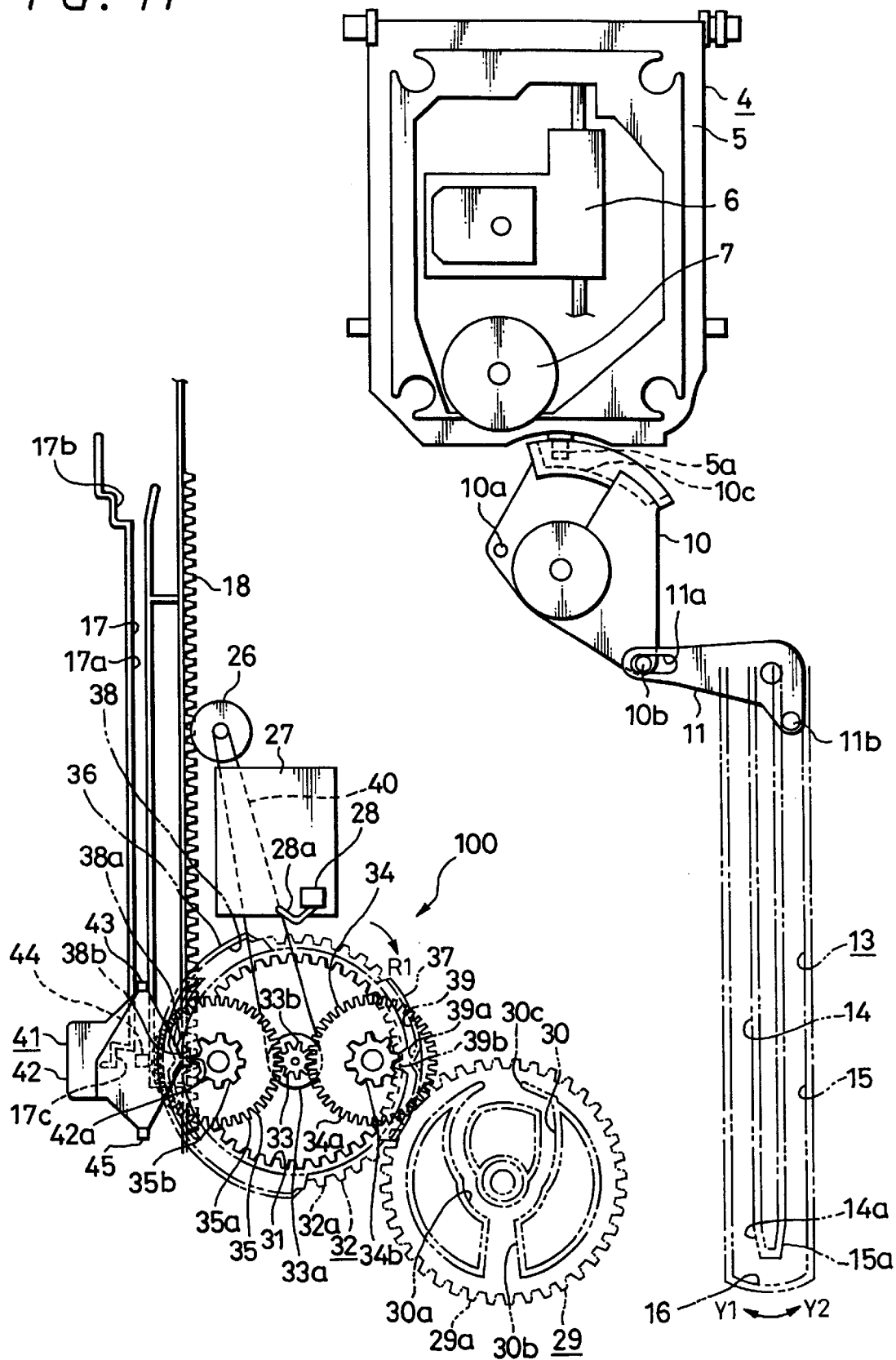
FIG. 11 is a schematic enlarged plan view showing the exchange mode.

While the cam member 10 is being located at the movement end of the C2 direction shown in FIGS. 8 to 10 and the base unit 4 is being located at the upper movement end, as shown in FIGS. 9 and 10, the engagement protrusion 11b is located at the right-hand end of the circular-arc groove portion 16. In this state, when the disk tray 12 is moved forward relative to the base assembly 3, as shown in FIG. 11, the engagement protrusion 11b is inserted into the second groove portion 15 and is being relatively moved backward within the second groove portion 15. Conversely, when the disk tray 12 is moved from the forward direction to the rearward direction, the engagement protrusion 11b is being relatively moved forward within the second groove portion 15.

Accordingly, when the disk tray 12 is moved relative to the base assembly 3, the engagement protrusion 11b of the swing lever 11 is engaged with the first groove portion 14 or the second groove portion 15 so as to become freely slidable so that the rotation of the cam member 10 is restricted, thereby preventing the cam member 10 from being rotated unnecessarily. Consequently, the base unit 4 can be prevented from being lowered and elevated unnecessarily by vibrations generated when the disk tray 12 is moved, for example. In particular, while the disk is being reproduced, it is possible to prevent accidents in which the base unit 4 is lowered to the lower movement end to release the disk from the chucking state so that reproduction is interrupted or the disk is dropped and broken.

Since the disk changer 1 prevents this cam member 10 from being rotated unnecessarily by using the swing lever 11, the movement amount of the engagement protrusion 11b can be reduced by properly setting the distance from the rotation center of the swing lever 11 to the oblong hole 11a and the distance from the rotation center to the engagement protrusion 11b.

Accordingly, a space in which the disk tray 12 is occupied by the support groove 13 can be reduced and spaces in which other respective assemblies and respective mechanisms of the disk changer 1 are disposed can be increased, thereby making it possible to improve freedom in design.

As described above, since the widths of the groove portions of the front end portions 14a, 15a of the first groove portion 14 and the second groove portion 15 are increased in the forward direction, when the disk tray 12 is moved from the loading position to the forward direction shown in FIG. 1 or 4, the engagement protrusion 11b of the swing lever 11 can reliably be inserted from the circular-arc groove portion 16 to the first groove portion 14 or the second groove portion 15.

At the position near the left end of the base assembly 3, there is formed a guide groove 17 extended back and forth and which is opened in the upper direction as shown in FIGS. 3 and 4. The guide groove 17 is comprised of a narrow restricting portion 17a formed excepting front and rear end portions thereof and a rear protruded portion 17b and a front protruded portion 17c respectively formed at the front end portion and the rear end portion. The rear protruded portion 17b and the front protruded portion 17c are formed so as to be protruded from the restricting portion 17a in the left-hand side, respectively.

A rack portion 18 which is extended back and forth is formed on the base assembly 3 at just right-hand side of the guide groove 17. Rack teeth of the rack portion 18 are faced to the right-hand side.

Figure 5:
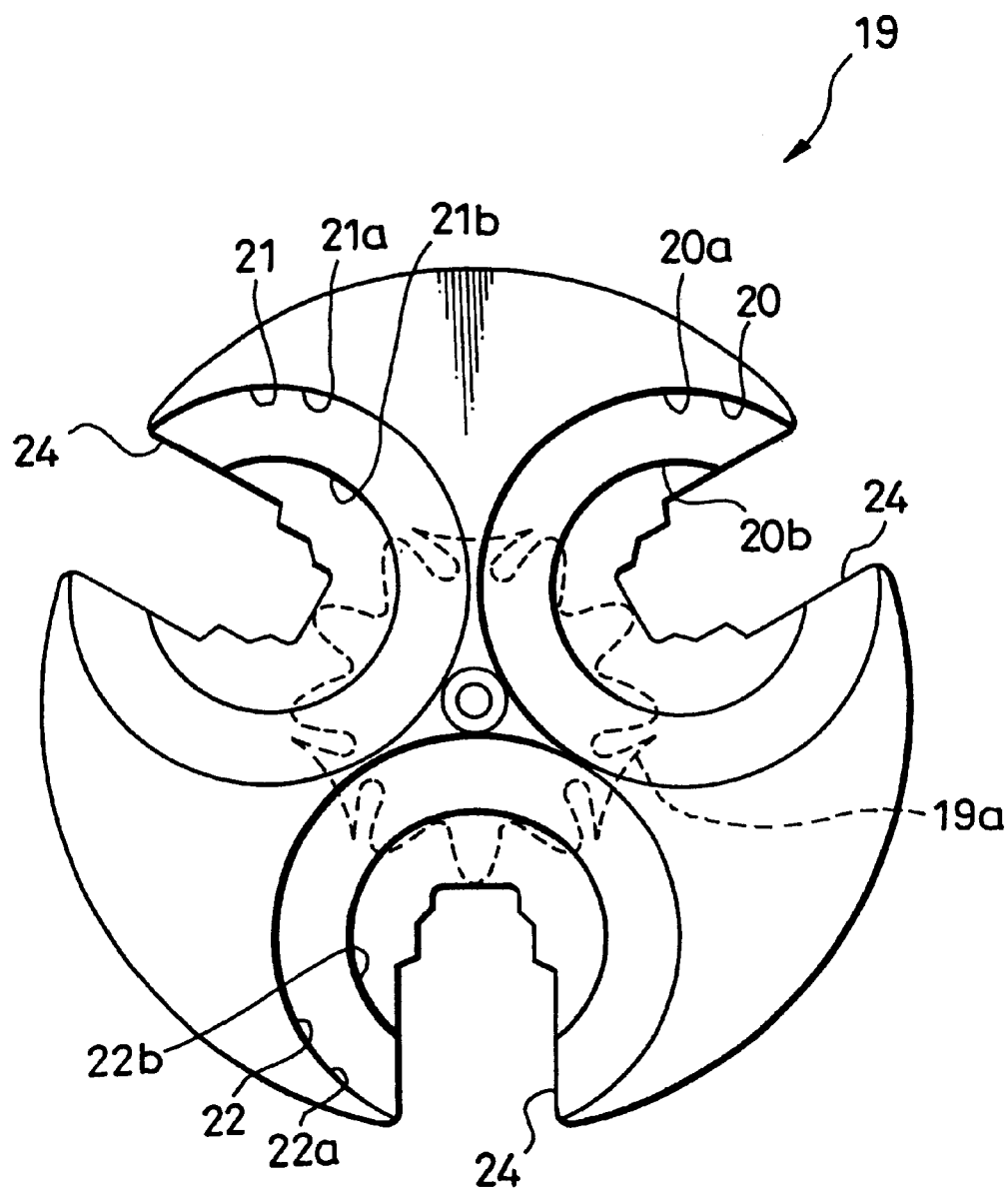
FIG. 5 is a plan view of a disk tray.

As shown in FIGS. 3 and 4, the disk tray 12 has a large shallow concave portion 12b of substantially circular shape formed at its portion excepting the rear end portion thereof. As shown in FIGS. 3 to 5, a disk hold table 19 is rotatably supported within the concave portion 12b.

The disk hold table 19 has three disk hold concave portions 20, 21, 22 formed along its circumferential direction at an equal space. Disks 23 can be held and loaded on the disk hold concave portions 20, 21, 22, respectively (see FIGS. 1 and 2). Disks having a diameter of about 12 cm and disks having a diameter of about 8 cm can be properly selected and loaded on the disk hold concave portions 20, 21, 22 as the disks 23, respectively. The disk hold concave portions 20, 21, 22 include first hold portions 20a, 21a, 22a of large diameters and second hold portions 20b, 21b, 22b of small diameters for selectively loading the above large and small disks.

On the disk hold table 19, there are formed insertion recesses 24, 24, 24 along the circumferential direction with equal space in order to elevate the disk table 7 from the lower movement end. The disk hold table 19 has at its bottom surface formed a pressed protrusion edge 19a of a predetermined shape.

As shown in FIGS. 3 and 4, a first circuit board 25 is disposed at the left-hand end portion of the rear end portion of the disk tray 12. A drive motor 26 is attached to the first circuit board 25 in such a direction that a motor shaft thereof is protruded in the lower direction.

A second circuit board 27 is disposed at the rear end portion of the concave portion 12b of the disk tray 12 as shown in FIGS. 3 and 4. A switch 28 is provided at the front end portion of the second circuit board 27. The switch 28 includes an operation lever 28a.

On the bottom surface of the disk tray 12, there is rotatably supported a cam gear 29 which is coaxial with the rotation fulcrum of the disk hold table 19 (see FIGS. 3 and 4). A gear portion 29 is formed around the peripheral edge of the cam gear 29, and a cam groove portion 30 which is opened in the lower direction is formed on the bottom surface of the cam gear. As shown in FIG. 8, the cam groove portion 30 is comprised of an endless-like portion 30a of a predetermined shape and an insertion-eject portion 30b and an insertion-eject slot 30c of substantially rectilinear shapes continued at the positions opposite to the endless-like portion 30a.

Figure 7:
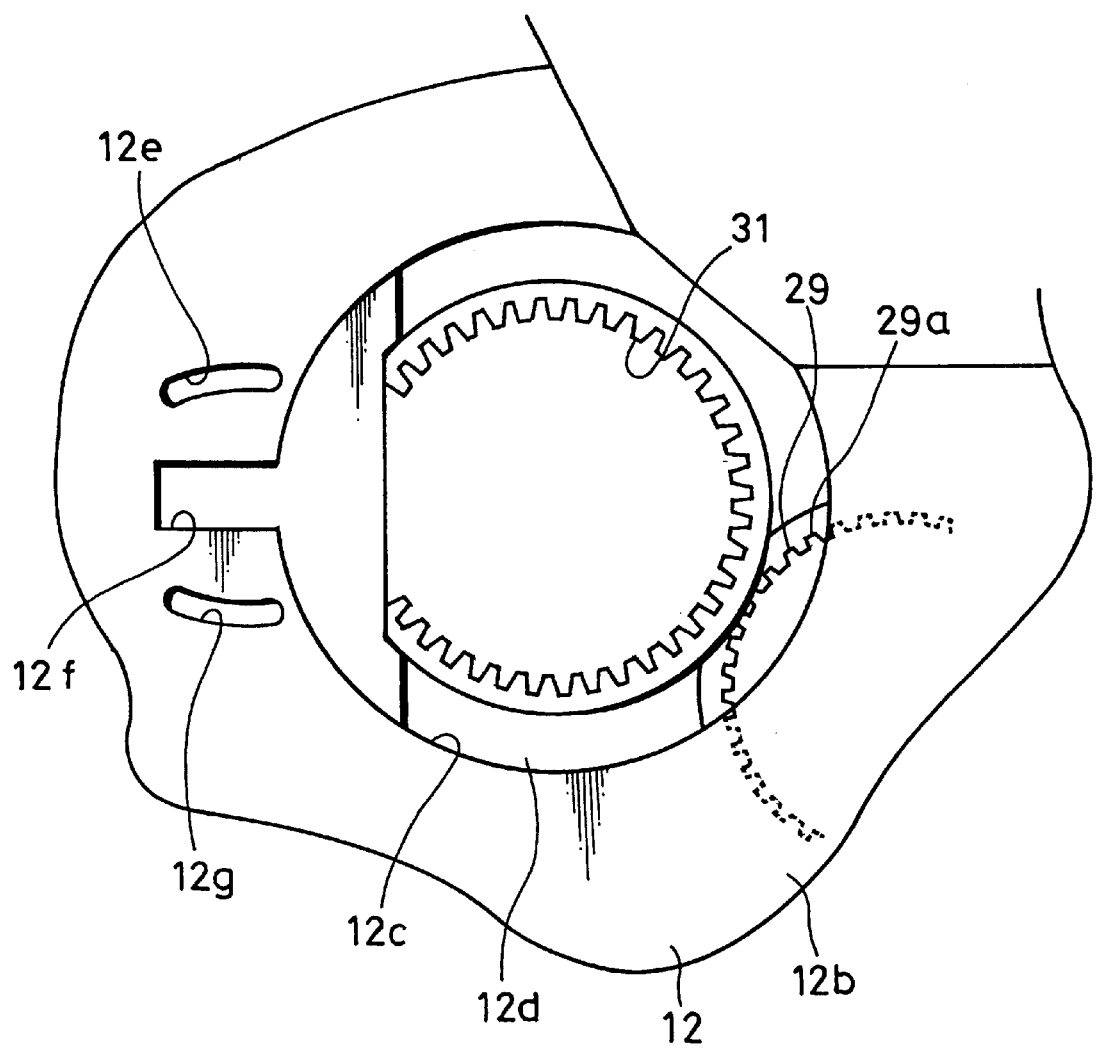
FIG. 7 is an enlarged plan view of a main portion while the gear unit is being removed.

A layout hole 12c is formed on the concave portion 12b of the disk tray 12. The layout hole 12c is partly closed by a cross-link portion 12d integrally formed with the disk tray 12 (see FIG. 7). An internal gear 31 is formed on the cross-link portion 12d, and the left end portion of the internal gear 31 is formed as a geneva stop gear portion.

Three insertion holes 12e, 12f, 12g are formed at the left-hand side of the layout hole 12c of the disk tray 12 with intervals back and forth. The insertion holes 12e, 12f, 12g are all oblong in the right and left direction.

Figure 6:
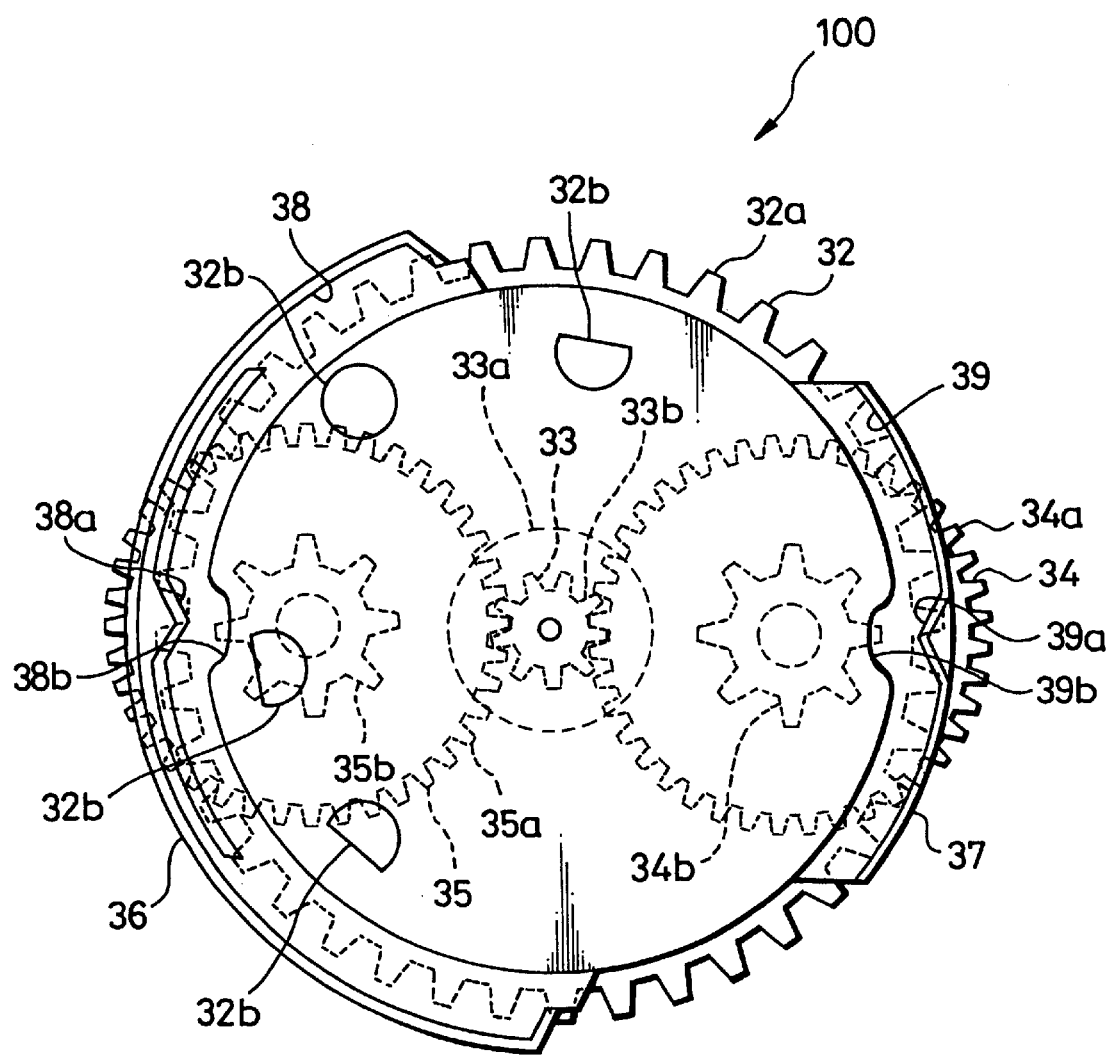
FIG. 6 is an enlarged plan view of a gear unit.

As shown in FIG. 6, a gear unit 100 is supported to the cross-link portion 12d of the disk tray 12. The gear unit 100 is comprised of a rotary base 32, a center gear 33, a first planet gear 34 and a second planet gear 35.

A gear portion 32a is formed around the peripheral edge of the rotary base 32, and the gear portion 32a is meshed with the gear portion 29a of the cam gear 29. A first protruded edge 36 and a second protruded edge 37 which are extended in the circumferential direction, respectively, are provided around the peripheral edge portion of the rotary base 32, and a first slide groove 38 and a second slide groove 39, each of which is opened upwardly and extended in the circumferential direction, are formed on the first protruded edge 36 and the second protruded edge 37. A protruded amount of the first protruded edge 36 in the outside is larger than that of the second protruded edge 37.

The first protruded portion 36 and the second protruded portion 37 are both located above the gear portion 32a. The first protruded portion 36 is provided in an opposing relation to the portions over approximately 180° of the central angle of the rotary base 32. The second protruded portion 37 is located in such a manner that both ends thereof in the circumferential direction are spaced apart from both ends of the circumferential direction of the first protruded edge 36. Accordingly, on the peripheral edge of the rotary base 32, there are formed portions in which neither the first protruded edge 36 nor the second protruded edge 37 is provided.

A central portion in the circumferential direction of a first slide groove 38 is formed as a displacement portion 38a in such a manner that the displacement portion is displaced so as to progressively approach the center of the rotary base 32 in the center. At the center in the circumferential direction of the displacement portion 38a, there is formed a first engagement concave portion 38b which is concaved in the inner direction. A central portion in the circumferential direction of a second slide groove 39 also is formed as a displacement portion 39a in such a manner that this displacement portion is displaced so as to progressively approach the center of the rotary base 32 in the center. At the center in the circumferential direction of the displacement portion 39a, there is formed a second engagement concave portion 39b which is concaved in the inner direction. The first concave portion 38b and the second concave portion 39b are located on the opposite sides in an angular extent of 180° across the center of the rotary base 32. The first engagement concave portion 38b and the second engagement concave portion 39b are both located on a prolonged line connecting the respective rotation centers of the first planet gear 34 and the second plane gear 35.

Since the protruded amount of the first protruded edge 36 is large, when the rotary base 32 is rotated, the first protruded edge 36 can come in contact with the operation lever 28a of the switch 28 so that the operation lever 28 is pressed by the first protruded edge 36.

At the positions near the peripheral edge of the upper surface of the rotary base 32, there are protruded four pressed protruded portions 32b, 32b, . . . , which are spaced apart from each other in the circumferential direction. The pressed protruded portions 32b, 32b, . . . are located at the positions corresponding to an angular extent of 180° of the central angle of the rotary base 32.

The center gear 33 is rotatably supported to the bottom surface side of the rotary base 32 in such a manner that it may become coaxial with the rotary base 32. The center gear 33 is formed by integrally forming a pulley 33a located at the lower side and a gear portion 33b located at the upper side. A power transmission belt 40 is extended between the pulley 33a and a drive shaft of the drive motor 26.

The first planet gear 34 and the second planet gear 35 are rotatably supported at the positions of the opposite sides across the center of the rotary base 32, respectively, and they are formed by integrally forming large-diameter gear portions 34a, 35a located at the upper side and small-diameter gear portions 34b, 35b located at the lower side. Both in the first planet gear 34 and the second planet gear 35, the large-diameter gear portions 34a, 35a are each meshed with the gear portion 33b of the center gear 33, and the small-diameter gear portions 34b, 35b are meshed with the internal gear 31. The first planet gear 34 and the second planet gear 35 are meshed with the rack portion 18 formed on the base assembly 3 when the small-diameter gear portions 34b, 35b are located in an opposing relation to the geneva stop gear portion of the internal gear 31.

A stopper member 41 is supported to the insertion holes 12e, 12f, 12g defined on the base assembly 3 so as to become freely movable. The stopper member 41 is formed by integrally forming a base portion 42, a first leg portion 43, a second leg portion 44 and a third leg portion 45 which are downwardly protruded from the base portion 42. The first leg portion 43, the second leg portion 44, the third leg portion 45 are respectively inserted into the insertion holes 12e, 12f, 12g from the upper direction and their tip end portions can be inserted into the guide groove 17 defined on the base assembly 3. On the right end portion of the base portion 42, there is formed an engagement protrusion piece 42a which is protruded in the lower direction. The engagement protrusion piece 42a is engaged with the first slide groove 38 or the second slide groove 39 of the rotary base 32.

Operations of the gear unit 100 and operations associated with operations of the gear unit will be described below.

The drive motor 26 is rotated and drive force thereof is transmitted to the center gear 33 by the power transmission belt 40. As the center gear 33 is rotated, there are rotated the first planet gear 34 and the second planet gear 35 which are meshed with the gear portion 33b of the center gear 33. When the first planet gear 34 and the second planet gear 35 are rotated, since at least one of the small-diameter gear portion 34b of the first planet gear 34 and the small-diameter gear portion 35b of the second planet gear 35 is meshed with the internal gear 31, the first planet gear 34 and the second planet gear 35 revolve around the center gear 33.

While the first planet gear 34 and the second planet gear 35 are revolving around the center gear, the first planet gear 34 or the second planet gear 35 is temporarily being meshed with the rack portion 18 provided on the base assembly 3 (see FIGS. 8 and 10).

When the first planet gear 34 and the second planet gear 35 are revolving, there is rotated the rotary base 32 which support thereon these gears 34, 35. As the rotary base 32 is rotated, the engagement protrusion piece 42a of the stopper member 41 is relatively moved within the first slide groove 38 or the second slide groove 39. At that very time, as described above, when the first protruded edge 36 is brought in contact with the operation lever 28a of the switch 28, the operation lever 28 is pressed by the first protruded edge.

At the same time the rotary base 32 is rotated, the cam gear 29 meshed with the gear portion 32a of the rotary base 32 also is rotated. At that very time, when the disk tray 12 is located at the loading position, the cam protruded portion 10a of the cam portion 10 is engaged with the endless-like portion 30a of the cam groove 30 of the cam gear 29 so that the cam protruded portion 10a is moved within the endless-like portion 30a as the cam gear 29 is rotated. Accordingly, by the rotation of the cam gear 29, the cam member 10 is rotated so that the base unit 4 is ascended and descended between the upper movement end and the lower movement end as described above. At that very time, the swing lever 11 is swung as the cam member 10 is operated as described above.

Next, the manner in which respective modes of the disk exchanger are set will be described (see FIGS. 8 to 13).

First, the manner in which a disk reproducing mode shown in FIG. 9 is set from a stop mode shown in FIG. 8 will be described. The stop mode is the state in which the base unit 4 is descended and located at the lower movement end. At that very time, let it be assumed that the disks 23, 23, 23 are respectively loaded or held on the respective disk hold portions 20, 21, 22 of the disk hold table 19.

In the stop mode shown in FIG. 8, the disk tray 12 is located at the loading position, and the engagement protruded piece 42a of the stopper member 41 is engaged with the second engagement concave portion 39b of the second slide groove 39 of the rotary base 32. While the disk tray 12 is being located at the loading position, in the stopper member 41, the third leg portion 45 is engaged with the restricting portion 17a of the guide groove 17, the second leg portion 44 is located in an opposing relation to the rear side protruded portion 17b and the first leg portion 43 is set free. Accordingly, the stopper member 41 can rotate about the third leg portion 45.

At that very moment, the cam protruded portion 10a of the cam member 10 is engaged with the endless-like portion 30a of the cam gear 29 at its portion continued to the insertion-eject portion 30b, and the engagement protruded portion 11b of the swing lever 11 is located at the left-hand end of the circular-arc groove portion 16 of the support groove 13. The disk hold table 19 is located at a portion thereof between the disk hold concave portion 20 and the disk hold concave portion 21 above the disk table 7 of the base unit 4. Further, the operation lever 28a of the switch 28 is pressed by one end edge of the circumferential direction of the first protruded edge 36, and the switch is turned ON, for example.

In the stop mode, when a user operates a reproducing button, not shown, provided on the disk changer 1, the drive motor 26 is rotated and the rotary base 32 is rotated in the R1 direction shown in FIG. 8. When the rotary base 32 is rotated in the R1 direction, the operation lever 28a is released from being pressed by the first protruded edge 36, and the switch 28 is turned OFF immediately. Simultaneously, when the rotary base 32 is rotated, the cam gear 29 is rotated and the pressed protruded edge 19a of the disk hold table 19 is sequentially pressed by the press protruded portions 32b, 32b, whereby the disk hold table 19 is rotated. Upon completion of pressing the pressed protruded edge 19a by the press protruded portion 32b, 32b, one insertion recess 24 of the disk hold table 19 is moved above the disk table 7 and the disk 23 can be chucked.

Although the rotation of the disk hold table 19 is stopped when the press protruded portions 32a, 32b finish pressing the pressed protruded edge 19a, the rotary base 32 is continuously rotated in the R1 direction, thereby resulting in the cam gear 29 being rotated continuously. As the cam gear 29 is rotated, the position of the cam protruded portion 10a of the cam member 10 within the endless-like portion 30a is changed and the cam member 10 is rotated in the C2 direction shown in FIG. 8 so that the base unit 4 is elevated from the lower movement end to the upper movement end. While the base unit 4 is being elevated, the disk table 7 is projected from the above one insertion recess 24 to lift the disk from any one of the hold portions 20, 21, 22 and the disk 23 is chucked by the disk table 7 and the chucking pulley 9, whereby the disk 23 is upwardly spaced apart from the disk hold table 19. As the cam member 10 is rotated, the engagement protruded portion 11b of the swing lever 11 is located at the right-hand end of the circular-arc groove portion 16 (see FIG. 9).

The rotary base 32 is further rotated and the operation lever 28a of the switch 28 is again pressed by the other end edge of the first protruded edge 36, thereby resulting in the switch being turned ON. When the switch 28 is changed-over, a stop signal is supplied from a controller, not shown, to the drive motor 26 so that the drive motor 26 is stopped rotating and thereby the reproducing mode is set (see FIG. 9). Simultaneously, the above spindle motor, not shown, is rotated and thereby the disk table 7 is rotated. Then, the disk 23 thus chucked is irradiated with optical beams from the optical pickup 6 and thereby the reproducing operation of the chucked disk 23 is executed.

In the reproducing mode, the engagement protrusion piece 42a of the stopper member 41 is located at the portion slightly over the first engagement concave portion 38b of the first slide groove 38.

If the disk to be reproduced is not the disk desired by a user of the disk changer, then the stop signal is not supplied to the drive motor 26 and the rotary base 32 is further rotated to rotate the disk hold table 19. Then, in the reproducing mode in which a user becomes able to reproduce a desired disk 23, the stop signal is supplied to the drive motor 26. Accordingly, each time the rotary base 32 is rotated, the disk hold table 19 is rotated 120°. At that very time, the base unit 4 is temporarily descended to the lower movement end side and the chucking operation by the disk table 7 and the chucking pulley 9 is released.

Next, the manner in which an exchange mode in which any one of the disks 23, 23 can be exchanged while one disk 23 is being reproduced is set will be described (see FIGS. 10 and 11).

In the reproducing mode shown in FIG. 9, if an exchange button, not shown, provided on the changer 1 is operated by a user, then the drive motor 26 is rotated in the opposite direction and the rotary base 32 is rotated in the R2 direction shown in FIG. 9. When the rotary base 32 is rotated in the R2 direction, the engagement protruded piece 42a of the stopper member 41 is engaged with the first engagement concave portion 38b of the first slide groove 38 (see FIG. 10).

When the engagement protruded piece 42a is engaged with the first engagement concave portion 38b, the rotary base 32 is rotated in the R2 direction, whereby the engagement protruded piece 42a is pressed forward by the end edge of the first engagement concave portion 38b and the stopper member 41 is rendered rotation force in the F1 direction shown in FIG. 10. At that very time, the stopper member 41 is restricted from being rotated in the F1 direction after the second leg portion 44 has been brought in contact with the wall portion which forms the guide groove 17. Accordingly, even when the rotary base 32 is rotated in the R2 direction, the engagement protruded piece 42a of the stopper member 41 can be prevented from being disengaged from the engagement concave portion 38b and the rotary base 32 is locked by the stopper member 41 (see FIG. 10).

When the rotary base 32 is locked by the stopper member 41, although the rotary base 32 is stopped being rotated in the R2 direction, the first planet gear 34 and the second planet gear 35 are able to rotate relative to the rotary base 32 so that the first planet gear 34 and the second planet gear 35 are continuously rotated by drive force of the drive motor 26.

However, since the rotary base 32 is locked by the stopper member 41, the first planet gear 34 and the second planet gear 35 cannot revolve. At that very time, since the second planet gear 35 is meshed with the rack portion 18 provided on the base assembly 3, as shown in FIG. 11, when the second planet gear 35 is rotated, the disk tray 12 is moved to the forward position, i.e., the position projected from the insertion-eject slot 2a of the case 2 shown in FIG. 1 or 4.

While the engagement protruded piece 42a of the stopper member 41 is being engaged with the engagement concave portion 38b, as shown in FIG. 10, the cam protruded portion 10a of the cam member 10 is located at the portion opposing the insertion-eject slot 30c in the endless-like portion 30a of the cam gear 29. The engagement protruded portion 11b of the swing lever 11 is located at the position of the right-hand end of the circular-arc groove portion 16 of the support groove 13.(see FIG. 10). Accordingly, when the disk tray 12 is moved forward, as shown in FIG. 11, the cam protruded portion 10a is relatively ejected from the insertion-eject slot 30c, whereby the engagement protruded portion 11b is relatively moved within the second groove portion 15 of the support groove 13 in the rearward.

The disk tray 12 is moved through the insertion-eject slot 2a defined on the case 2 to the front movement end, i.e., the eject position, thereby resulting in the exchange mode being set (see FIGS. 2 and 11).

In the exchange mode, two hold portions of the hold portions 20, 21, 22 of the disk hold table 19 are projected from the case 2 and the two disks 23, 23 can be exchanged (see FIG. 2). In the exchange mode, the disk hold table 19 is not rotated and the disk tray 12 is moved to the eject position as shown in FIG. 1 or 2.

In the exchange mode, if the exchange of the disks 23, 23 is ended and a user operates a close button, not shown, provided on the changer 1, then the drive motor 26 is rotated in the direction in which the rotary base 32 is rotated in the R1 direction shown in FIG. 11. At that very time, the disk tray 12 is located at the eject position shown in FIGS. 1, 2, 4, in the stopper member 41, the first leg portion 43 is engaged with the restricting portion 17a of the guide groove 17, the second leg portion 44 is located in an opposing relation to the front protruded portion 17c and the third leg portion 45 is set free. Accordingly, the stopper member 41 can be rotated around the first leg portion 43.

Accordingly, when the drive motor 26 is rotated, the engagement protruded piece 42a is pressed rearwardly by the end edge of the first engagement concave portion 38b so that the stopper member 41 is rendered rotation force in the F2 direction shown in FIG. 11. At that very time, the second leg portion 44 is brought in contact with the wall portion which forms the guide groove 17 and thereby the stopper member 41 is restricted from being rotated in the F2 direction. Therefore, even when the rotary base 32 is rotated in the R1 direction, the engagement protruded piece 42a of the stopper member 41 can be prevented from being disengaged from the engagement concave portion 38b, and hence the rotary base 32 is locked by the stopper member 41. When the second planet gear 35 meshed with the rack portion 18 is rotated, the disk tray 12 is moved rearwardly up to the loading position shown in FIG. 3. At that time, the insertion recesses 24 of the hold portions on which there are held the disks 23 chucked by the disk table 7 and the chucking pulley 9 pass through the lower surface side of the disk table 7. During this period of time, the reproducing operation of the disk 23 chucked by the disk table 7 and the pulley 9 is continued.

Next, the manner in which an open mode in which the disk tray 12 is ejected from the case while the disk 23 is being reproduced is set will be described (see FIGS. 12 and 13).

In the stop mode shown in FIG. 8, if a user operates an open button, not shown, provided on the changer 1, then the drive motor 26 is rotated and thereby the rotary base 32 is rotated in the R1 direction shown in FIG. 8. When the rotary base 32 is rotated in the R1 direction, the operation lever 28a is released from being pressed by the first protruded edge 36 so that the switch 28 is turned OFF immediately. At that very moment, a controller, not shown, detects the switching of the switch 28 and the controller supplies a reverse rotation drive signal to the drive motor 26 so that the drive motor 26 is rotated in the reverse direction.

When the drive motor 26 is rotated in the reverse direction, the rotary base 32 is rotated in the R2 direction shown in FIG. 8. When the rotary base 32 is rotated in the R2 direction, the engagement protruded piece 42a of the stopper member 41 is again engaged with the second engagement concave portion 39b of the second slide groove 39.

When the engagement protruded piece 42a is engaged with the engagement concave portion 39b, similarly to the case in which the exchange mode is set, the rotary base 32 is locked by the stopper member 41.

When the rotary base 32 is locked by the stopper member 41, the first planet gear 34 and the second planet gear 35 cannot revolve but are rotated relative to the rotary base 32. At that very time, since the first planet gear 34 is meshed with the rack portion 18 provided on the base assembly 3, by the rotation of the first planet gear 34, the disk tray 12 is moved forward relative to the eject position direction shown in FIG. 1 (see FIG. 12).

While the engagement protruded piece 42a of the stopper member 41 is being engaged with the second engagement concave portion 39b, the cam protruded portion 10a of the cam member 10 is located at the position opposing to the insertion-eject portion 30b in the endless-like portion 30a of the cam gear 29 (see FIG. 8). The engagement protruded portion 11b of the swing lever 11 is located at the left-hand end of the circular-arc groove portion 16 of the support groove 13 (see FIG. 8). Accordingly, when the disk tray 12 is moved in the forward direction, the cam protruded portion 10a is relatively ejected from the insertion-eject portion 30b and the engagement protruded portion 11b is relatively moved backward within the first groove portion 14 of the support groove 13 (see FIG. 12).

Figure 12:
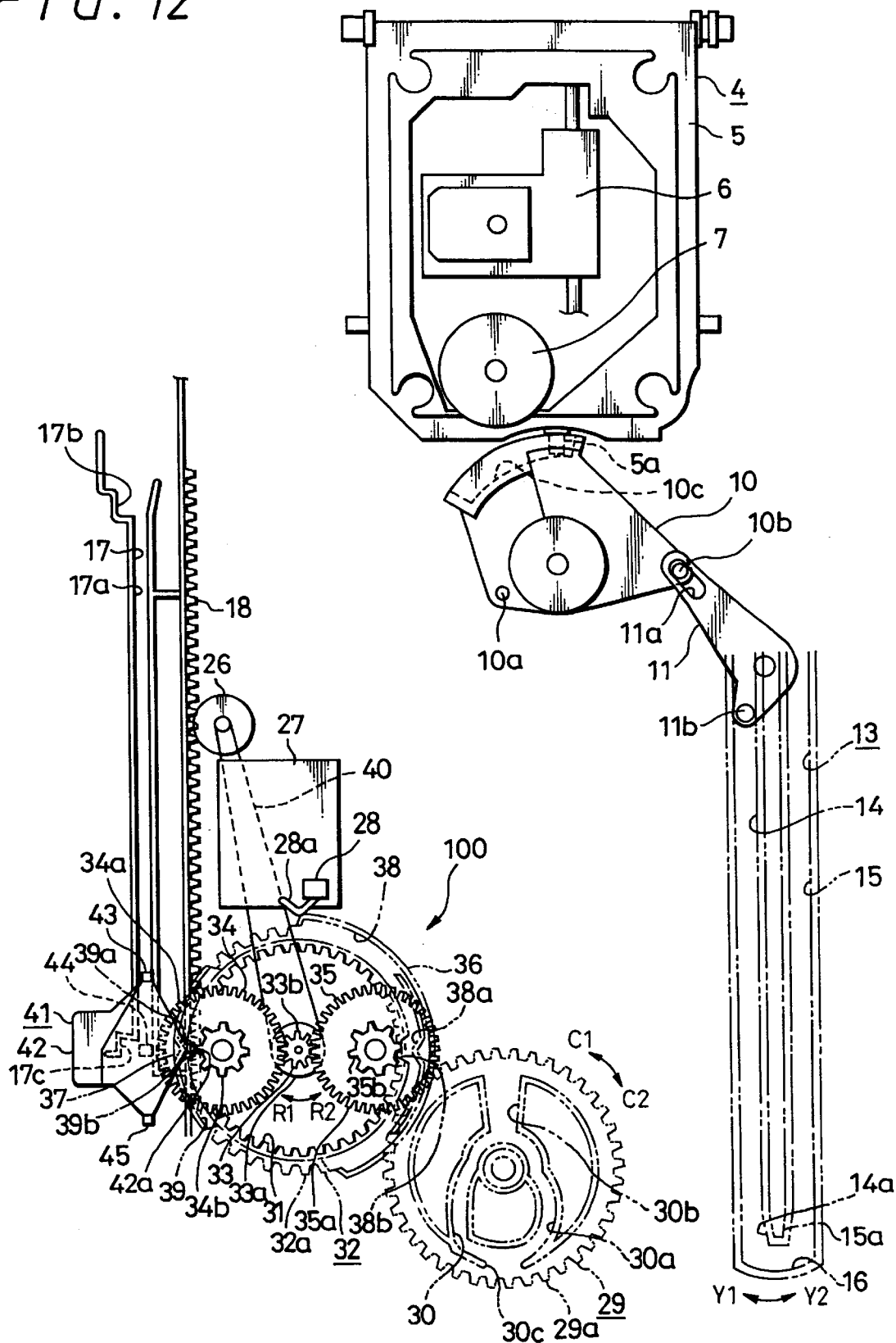
FIG. 12 is a schematic enlarged plan view showing the open mode.

The disk tray 12 is moved through the insertion-eject slot 2a formed on the case 2 up to the eject position, thereby setting the open mode (see FIGS. 1 and 12).

In the open mode, since the disk hold table 19 can be rotated, each of the three disks 23, 23, 23 held on the disk hold table 19 can be exchanged (see FIG. 1).

Figure 13:
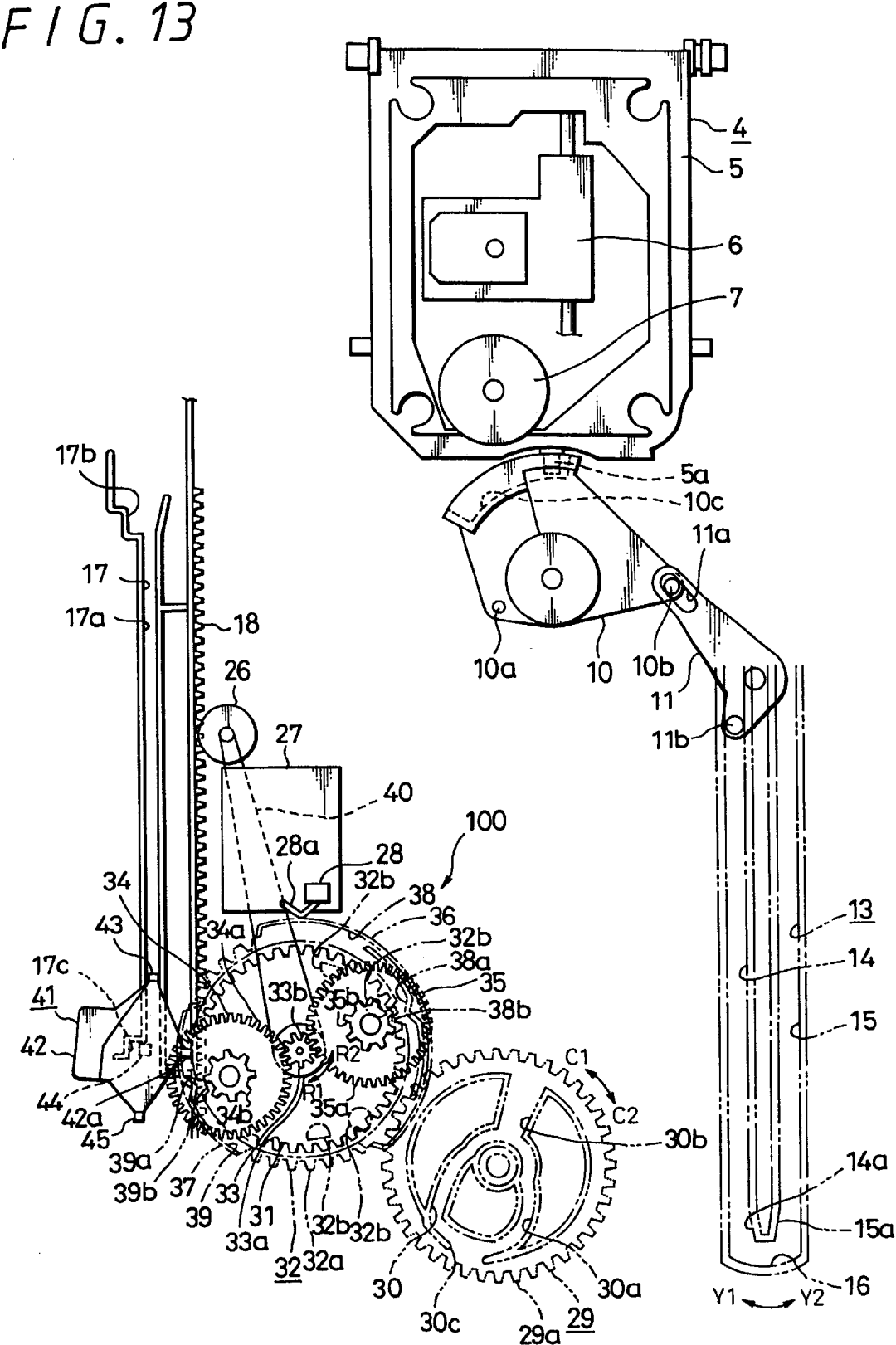
FIG. 13 is a schematic enlarged plan view showing the state in which the disk tray is rotated in the open mode.

In the open mode, when a table rotation button, not shown, is operated, the drive motor 26 is rotated in the direction in which the rotary base 32 is rotated in the R2 direction shown in FIG. 13. At that very time, the disk tray 12 is located at the eject position, in the stopper member 41, the first leg portion 43 is engaged with the restricting portion 17a of the guide groove 17, the second leg portion 44 is located in an opposing relation to the front protruded portion 17b and the third leg portion 45 is set free. Therefore, the stopper member 41 can be rotated around the first leg portion 43.

Accordingly, the rotary base 32 is not locked by the stopper member 41 and is therefore rotated in the R2 direction by drive force of the drive motor 26. The pressing protruded portions 32b, 32b of the rotary base 32 sequentially press the pressed protruded edge 19a of the disk hold table 19 to rotate the disk hold table 19. After the disk hold table 19 has been rotated 120°, the disk hold table is stopped and one disk 23 held on any one of the hold portions 20, 21, 22 can be exchanged (see FIG. 1). If a user intends to exchange another disk 23 continuously, then when a user again rotates the disk hold table 19 120° by operating the table rotation button, a user can exchange another disk.

In the open mode, after the exchange of the disks 23, 23, 23 had been ended, if a user operates the close button, not shown, then the drive motor 26 is rotated in the direction in which the rotary base 32 is rotated in the R1 direction shown in FIG. 13.

At that very time, since the stopper member 41 can be rotated around the first leg portion 43, the rotary base 32 is locked by the stopper member 41 and the first planet gear 34 and the second planet gear 35 are rotated relative to the rotary base 32. Accordingly, as the first planet gear 34 is rotated, the disk tray 12 is moved rearwardly up to the loading position shown in FIG. 3.

As described above, in the disk changer 1, in any one of the modes in which the disk 23 is being reproduced and in which the disk 23 is not being reproduced, when the first planet gear 34 and the second planet gear 35 are switched, the movement of the disk tray 12 relative to the base assembly 3 is carried out by one rectilinear rack portion 18.

Therefore, a space in which the rack portion 18 is disposed can be decreased considerably, a large space in which other mechanisms and respective members are disposed on the base assembly 3 can be maintained sufficiently, and freedom in design can be improved.

Further, since the movement of the disk tray 12 relative to the base assembly 3 and the ascending and descending of the base unit 4 are executed by the single drive motor 26, the number of assemblies can be reduced and the sufficiently large space to dispose mechanisms and assemblies can be maintained.

Furthermore, since the rotation of the disk hold table 19 is executed by the drive motor 26, the number of assemblies can be reduced more, and this contributes more to maintain the sufficiently large space to dispose mechanisms and assemblies.

While the disk changer according to the present invention has been described so far as the apparatus for reproducing the information signal from the disk, the present invention is not limited thereto and can be applied to a disk changer capable of recording an information signal on a disk.

Specific shapes and structures of the respective portions shown in the above embodiment are merely examples of shapes and structures embodied when the present invention is effected and therefore the technical scope of the present invention may not be limitedly interpreted by these shapes and structures of the above respective portions.

As will be clear from the above description, a disk recording and/or reproducing apparatus according to the present invention comprises a drive motor, a gear drive section including a center gear rotated by the drive motor and first and second planet gears meshed with the center gear and rotated by the center gear, the first and second planet gears being revolving around the center gear, a rack portion selectively meshed with any one of the first planet gear and the second planet gear, a disk tray including a plurality of holding portions on which a plurality of disk-like recording mediums are held, respectively, the disk tray being freely moved between an eject position at which at least one of a plurality of holding portions is projected to the outside of an apparatus body and a loading position at which at least one of a plurality of holding portions is loaded into the apparatus body, a recording and/or reproducing section for recording or reproducing any one disk-like recording medium of a plurality of disk-like recording mediums respectively held on a plurality of holding portions and a preventing mechanism for preventing the first planet gear and the second planet gear from revolving when any of the first planet gear and the second planet gear is meshed with the rack portion, wherein when the disk tray is moved to the eject position while the recording and/or reproducing section is being located at the non-operation state, the preventing mechanism prevents the first planet gear and the second planet gear from revolving and the first planet gear is meshed with the rack portion thereby to allow the disk tray to move between the loading position and the eject position and when the disk tray is moved to the eject position while the recording and/or reproducing section is placed in the state for recording or reproducing any one disk-like recording medium of a plurality of disk-like recording mediums which are respectively held on a plurality of holding portions, the preventing mechanism prevents the first planet gear and the second planet gear from revolving and the second planet gear is meshed with the rack portion thereby to allow the disk tray to move between the loading position and the eject position.

Therefore, since the disk tray is moved between the loading position at which the disk tray is loaded into the apparatus body and the eject position at which the disk tray is ejected to the outside of the apparatus body by switching the first planet gear and the second planet gear meshed with the rack portion, the space in which the rack portion is disposed can be considerably reduced, the large space in which respective members of other mechanisms are disposed can be maintained sufficiently, thereby making it possible to increase freedom in design.

What is claimed is:

1. A disk recording and/or reproducing apparatus comprising:
   a drive motor;
   a gear drive section including a center gear rotated by said drive motor and first and second planet gears meshed with said center gear and rotated by said center gear, said first and second planet gears revolving around said center gear;
   a rack portion selectively meshed with any one of said first planet gear and said second planet gear;
   a disk tray including a plurality of holding portions on which a plurality of disk-like recording mediums are held respectively, said disk tray being freely movable between an eject position at which at least one of said plurality of holding portions is projected to the outside of an apparatus body and a loading position at which at least one of said plurality of holding portions is loaded into said apparatus body;
   a recording and/or reproducing section for recording or reproducing at least one disk-like recording medium of said plurality of disk-like recording mediums held on said plurality of holding portions; and
   a preventing mechanism for preventing said first planet gear and said second planet gear from revolving when any one of said first planet gear and said second planet gear is meshed with said rack portion, wherein when said disk tray is moved to said eject position while said recording and/or reproducing section is being placed in a non-operation state, said preventing mechanism prevents said first planet gear and said second planet gear from revolving and said first planet gear is meshed with said rack portion to thereby allow said disk tray to move between said loading position and said eject position and when said disk tray is moved to said eject position while said recording and/or reproducing section is being placed in the state for recording or reproducing any disk-like recording medium of said plurality of disk-like recording mediums held on said plurality of holding portions, said preventing mechanism prevents said first planet gear and said second planet gear from revolving and said second planet gear is meshed with said rack portion to thereby allow said disk tray to move between said loading position and said eject position.

2. A disk recording and/or reproducing apparatus according to claim 1, wherein at least said drive motor and said gear drive section are provided on said disk tray.

3. A disk recording and/or reproducing apparatus according to claim 2, wherein said gear drive section further includes a rotary base for rotatably supporting said first planet gear and said second planet gear, said rotary base being rotated while said first planet gear and said second planet gear are revolving and said rotary base is provided on said disk tray so as to become freely rotatable.

4. A disk recording and/or reproducing apparatus according to claim 3, further comprising a holding table including said plurality of hold portions and which is rotatably provided on said disk tray and said holding table is rotated as said rotary base is rotated.

5. A disk recording and/or reproducing apparatus according to claim 1, further comprising an ascending and descending drive section for ascending and descending said recording and/or reproducing section between an ascending position at which any disk-like recording medium of said plurality of disk-like recording mediums is recorded or reproduced and a descending position lower than said disk tray.

6. A disk recording and/or reproducing apparatus according to claim 5, wherein said ascending and descending drive section includes a cam gear rotated by said gear drive section and a cam assembly rotated by said cam gear and said recording and/or reproducing section is moved between said ascending position and said descending position as said cam assembly is rotated.

7. A disk recording and/or reproducing apparatus according to claim 6, wherein said gear drive section further includes a rotary base for rotatably supporting said first planet gear and said second planet gear, said rotary base being rotated while said first planet gear and said second planet gear are revolving and said rotary base drives said cam gear.

8. A disk recording and/or reproducing apparatus according to claim 6, wherein said cam assembly includes a protruded portion, said cam gear includes a cam groove with which said protruded portion is engaged and said cam groove includes a discontinuous portion such that at least said protruded portion can be disengaged from said cam groove when said recording and/or reproducing section is located at the position corresponding to said ascending position and said disk tray is moved to said eject position.

9. A disk recording and/or reproducing apparatus according to claim 6, wherein said ascending and descending drive section further includes a holding mechanism for holding said recording and/or reproducing section at said ascending position while said recording and/or reproducing section is being located at said ascending position.

10. A disk recording and/or reproducing apparatus according to claim 9, wherein said holding mechanism is comprised of a swing lever swung by said cam assembly and a supporting groove formed on said disk tray, said supporting groove being engaged with said swing lever.

11. A disk recording and/or reproducing apparatus according to claim 10, wherein said supporting groove includes a first groove portion which is engaged with said swing lever when said disk tray is moved to said eject position while said recording and/or reproducing section is being placed in the non-operation state and a second groove portion which is engaged with said swing lever when said disk tray is moved to said eject position while said recording and/or reproducing section is being placed in the state for recording or reproducing any disk-like recording medium of said plurality of disk-like recording mediums held on said plurality of holding portions.

12. A disk recording and/or reproducing apparatus comprising:
- a drive motor;
- a gear drive section including a center gear rotated by said drive motor and first and second planet gears meshed with said center gear and rotated by said center gear, said first and second planet gears being revolving around said center gear;
- a rack portion selectively meshed with any one of said first planet gear and said second planet gear;
- a disk tray including a plurality of holding portions on which a plurality of disk-like recording mediums are held, respectively, said disk tray being freely movable between an eject position at which at least one of said plurality of holding portions is projected to the outside of an apparatus body and a loading position at which at least one of said plurality of holding portions is loaded into said apparatus body;
- a recording and/or reproducing section for being ascended and descended between an ascending position at which any one disk-like recording medium of said plurality of disk-like recording mediums held on said plurality of holding portions is recorded or reproduced and a descending position lower than said disk tray; and
- a preventing mechanism for preventing a first planet gear and a second planet gear from revolving when any one of said first planet gear and said second planet gear is meshed with said rack portion, wherein said preventing mechanism prevents said first planet gear and said second planet gear from revolving when said disk tray is moved to said eject position while said recording and/or reproducing section is being located at said descending position and when said disk tray is moved, said preventing mechanism prevents said first planet gear and said second planet gear from revolving and said first planet gear is meshed with said rack portion to thereby allow said disk tray to move between said loading position and said eject position and when said disk tray is moved to said eject position while said recording and/or reproducing section is being located at said ascending position, and wherein said preventing mechanism prevents said first planet gear and said second planet gear from revolving and said second planet gear is meshed with said rack portion to thereby allow said disk tray to be moved between said loading position and said eject position.

13. A disk recording and/or reproducing apparatus according to claim 12, further comprising an ascending and descending drive section for ascending and descending said recording and/or reproducing section between said ascending position and said descending position.

14. A disk recording and/or reproducing apparatus according to claim 13, wherein said ascending and descending drive section includes a cam gear rotated by said gear drive section and a cam assembly rotated by said cam gear and said recording and/or reproducing section is ascended and descended between said ascending position and said descending position as said cam assembly is rotated.

15. A disk recording and/or reproducing apparatus according to claim 14, wherein said gear drive section further includes a rotary base for rotatably supporting said first planet gear and said second planet gear, said rotary base being rotated as said first planet gear and said second planet gear are revolving and said rotary base drives said cam gear.

16. A disk recording and/or reproducing apparatus according to claim 14, wherein said cam assembly includes a protruded portion, said cam gear includes a cam groove which is engaged with said protruded portion and said cam groove includes a discontinuous portion such that at least said protruded portion can be disengaged from said cam groove when said recording and/or reproducing section is located at the position corresponding to said ascending position and said disk tray is moved to said eject position.

17. A disk recording and/or reproducing apparatus according to claim 14, wherein said ascending and descending drive section further includes a holding mechanism for holding said recording and/or reproducing section at said ascending position when said recording and/or reproducing section is located at said ascending position.

18. A disk recording and/or reproducing apparatus according to claim 17, wherein said holding mechanism is comprised of a swing lever swung by said cam assembly and a supporting groove formed on said disk tray and which is engaged with said swing lever.

19. A disk recording and/or reproducing apparatus according to claim 18, wherein said supporting groove includes a first groove portion which is engaged with said swing lever when said disk tray is moved to said eject position while said recording and/or reproducing section is being located at said descending position and a second groove portion which is engaged with said swing lever when said disk tray is moved to said eject position while said recording and/or reproducing section is being located at said ascending position.

20. A disk recording and/or reproducing apparatus comprising:
- a disk tray including a plurality of holding portions on which a plurality of disk-like recording mediums are held, respectively, said disk tray being freely moved between an eject position at which at least one holding portion of a plurality of holding portions is ejected to the outside of an apparatus body and a loading position at which at least one holding portion of a plurality of holding portions is loaded into said apparatus body;
- a moving mechanism for moving said disk tray between said eject position and said loading position;
- a recording and/or reproducing section ascended and descended between an ascending position at which any one disk-like recording medium of said plurality of disk-like recording mediums held on said plurality of holding portions is recorded or reproduced and a descending position lower than said disk tray;
- an ascending and descending drive section for ascending and descending said recording and/or reproducing section between said ascending position and said descending position, wherein said ascending and descending drive section includes a cam gear rotated by said moving mechanism and a cam assembly rotated by said cam gear and said recording and/or reproducing section is ascended and descended between said ascending position and said descending position as said cam assembly is rotated; and
- a holding mechanism for holding said recording and/or reproducing section at said ascending position when said recording and/or reproducing section is located at said ascending position wherein said holding mechanism comprises a swing lever swung by said cam assembly and a supporting groove formed on said disk tray and which is engaged with said swing lever.

21. A disk recording and/or reproducing apparatus according to claim 20, wherein said supporting groove includes a first groove portion which is engaged with said swing lever when said disk tray is moved to said eject position while said recording and/or reproducing section is being located at said descending position and a second groove portion which is engaged with said swing lever when said disk tray is moved to said eject position while said recording and/or reproducing section is being located at said ascending position.

22. A disk recording and/or reproducing apparatus according to claim 20, wherein said cam assembly includes a protruded portion, said cam gear includes a cam groove which is engaged with said protruded portion and said cam groove includes a discontinuous such that at least said protruded portion can be disengaged from said cam groove when said recording and/or reproducing section is located at the position corresponding to said ascending position and said disk tray is moved to said eject position.

23. A disk recording and/or reproducing apparatus according to claim 20, wherein said moving mechanism includes a drive motor, a center gear rotated by said drive motor, a gear drive section including first and second planet gears meshed with said center gear and rotated by said center gear, said first and second planet gears being revolving around said center gear and a rack portion selectively meshed with one of said first planet gear and said second planet gear.

24. A disk recording and/or reproducing apparatus according to claim 23, wherein said gear drive section further includes a rotary base for rotatably supporting said first planet gear and said second planet gear, said rotary base being rotated as said first planet gear and said second planet gear are revolving and said rotary base drives said cam gear.

25. A disk recording and/or reproducing apparatus according to claim 23, further comprising a preventing mechanism for preventing said first planet gear and said planet gear from revolving when any of said first planet gear and said second planet gear is meshed with said rack portion, when said disk tray is moved to said eject position while said recording and/or reproducing section is being located at said descending position, said preventing mechanism prevents said first planet gear and said second planet gear from revolving and said first planet gear is meshed with said rack portion thereby to allow said disk tray to move between said loading position and said eject position and when said disk tray is moved to said eject position while said recording and/or reproducing section is being located at said ascending position, said preventing mechanism prevents said first planet gear and said second planet gear from revolving and said first planet gear is meshed with said rack portion thereby to allow said disk tray to move between said loading position and said eject position.

* * * * *